(12) United States Patent
Piccione et al.

(10) Patent No.: US 9,006,327 B2
(45) Date of Patent: *Apr. 14, 2015

(54) PROCESS FOR PREPARING PRECOMPOSITES BASED ON NANOTUBES, PARTICULARLY CARBON NANOTUBES

(75) Inventors: Patrick Piccione, Pau (FR); Alexander Korzhenko, Saint Victor d'Epine (FR); Benoît Brule, Beaumont le Roger (FR)

(73) Assignee: Arkema France, Colombes (FR)

( * ) Notice: Subject to any disclaimer, the term of this patent is extended or adjusted under 35 U.S.C. 154(b) by 335 days.

This patent is subject to a terminal disclaimer.

(21) Appl. No.: 12/124,403

(22) Filed: May 21, 2008

(65) Prior Publication Data
US 2008/0312364 A1 Dec. 18, 2008

(30) Foreign Application Priority Data
May 22, 2007 (FR) ...................... 07 03621

(51) Int. Cl.
C08K 3/04 (2006.01)
C08K 5/04 (2006.01)
C08K 5/36 (2006.01)
B82Y 30/00 (2011.01)
B82Y 40/00 (2011.01)
C08K 7/24 (2006.01)

(52) U.S. Cl.
CPC . C08K 7/24 (2013.01); B82Y 30/00 (2013.01); Y10S 977/742 (2013.01)

(58) Field of Classification Search
CPC .............. C08K 3/04; C08K 5/04; C08K 5/36; C08K 2201/011; B82Y 30/00; B82Y 40/00
USPC ........ 252/182.17, 182.23; 524/392, 394, 495, 524/496; 977/742
See application file for complete search history.

(56) References Cited

U.S. PATENT DOCUMENTS

| 2002/0113335 | A1* | 8/2002 | Lobovsky et al. ............ 264/184 |
| 2004/0209782 | A1* | 10/2004 | Zhang et al. .................. 508/113 |
| 2004/0262581 | A1* | 12/2004 | Rodrigues ..................... 252/500 |
| 2005/0025694 | A1* | 2/2005 | Zhang et al. ............... 423/447.1 |
| 2006/0098389 | A1* | 5/2006 | Liu et al. ....................... 361/502 |
| 2006/0189822 | A1 | 8/2006 | Yoon et al. |
| 2007/0202287 | A1 | 8/2007 | Katayama et al. |

FOREIGN PATENT DOCUMENTS

JP 2008 001866 1/2008

OTHER PUBLICATIONS

Database WPI week 200731 Derwent Publications Ltd., London, GB; AN 2007-317875, XP002470952.
Database WPI week 200545 Derwent Publications Ltd., London, GB; AN 2005-444869, XP002470953.
English Translation of Office Action for related Japanese Patent Application No. 2008 132094 dated Nov. 16, 2012.
Office Action for related Japanese Patent Application No. 2008 132094 dated Nov. 16, 2012.
Toyo Tire and Rubber Co Ltd., "Polyurethane sheet and its production process," Publication Date: Jan. 10, 2008; English Abstract of JP-2008 001866.

* cited by examiner

*Primary Examiner* — Ling Choi
*Assistant Examiner* — Ronald Grinsted
(74) *Attorney, Agent, or Firm* — Millen, White, Zelano & Branigan, P.C.

(57) ABSTRACT

The subject of the present invention is a process for preparing a precomposite based on nanotubes, comprising bringing said nanotubes into contact with at least one given plasticizing agent.
It also relates to a precomposite thus obtained, and to its use for conferring at least one electrical, mechanical and/or thermal property on a polymer material.
It also relates to the use of a given plasticizer for improving the dispersion and/or mechanical properties and/or electrical conductivity and/or thermal conductivity of nanotubes in a polymer matrix.

19 Claims, 1 Drawing Sheet

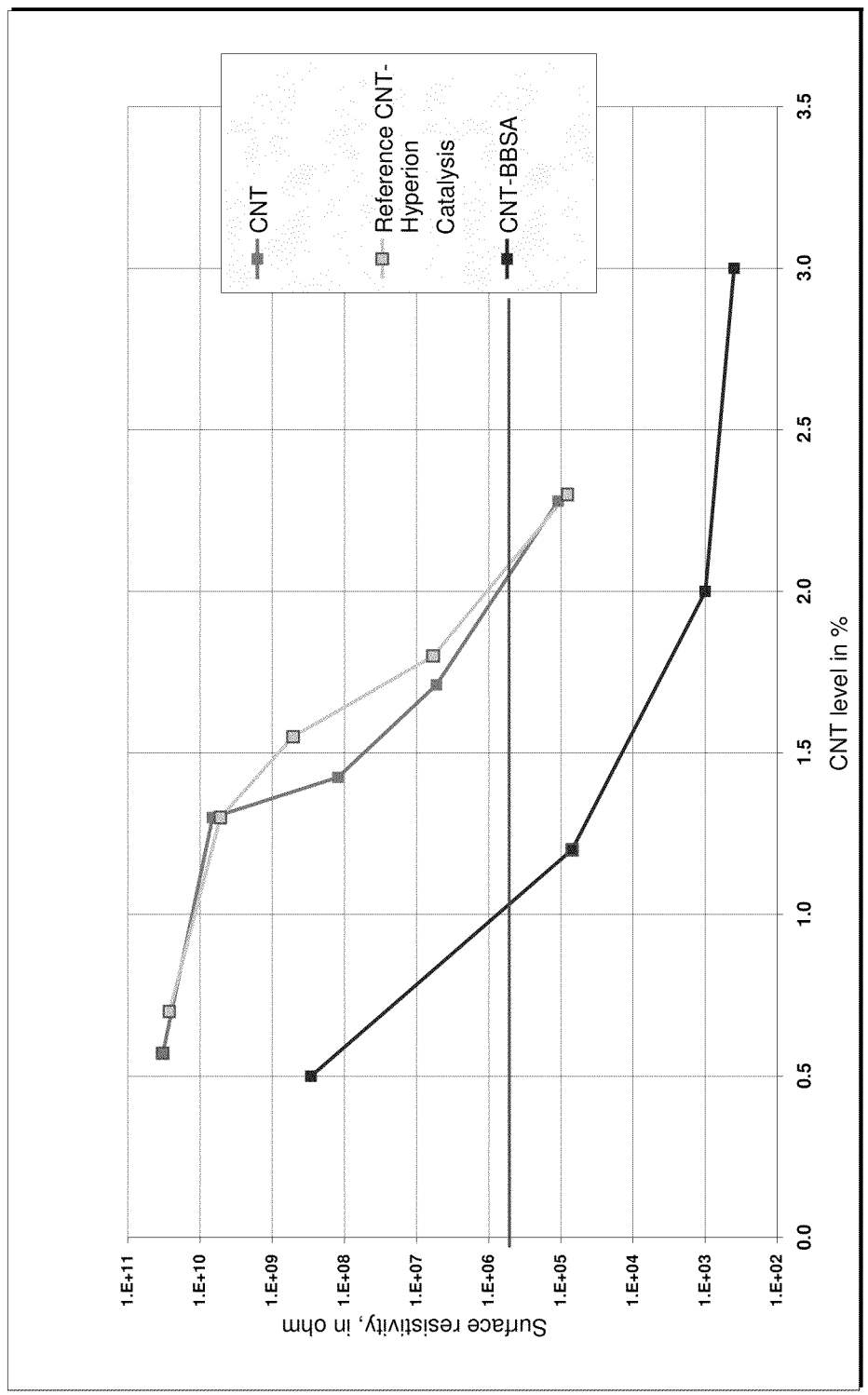

PROCESS FOR PREPARING PRECOMPOSITES BASED ON NANOTUBES, PARTICULARLY CARBON NANOTUBES

The present invention relates to a process for preparing precomposites based on nanotubes, particularly carbon nanotubes, certain precomposites thus obtained and the use of these precomposites for forming composites.

Carbon nanotubes (or CNTs) are known and possess specific crystalline structures, of tubular shape, which are hollow and closed, composed of atoms arranged regularly in the form of pentagons, hexagons and/or heptagons, obtained from carbon. CNTs are generally composed of one or more rolled graphite sheets. Single-wall nanotubes (SWNT) and multi-wall nanotubes (MWNT) are thus distinguishable.

CNTs are commercially available and may be prepared by known methods. Several processes exist for synthesizing CNTs, particularly electric discharge, laser ablation and chemical vapor deposition (CVD) which makes it possible to ensure the large scale manufacture of carbon nanotubes and therefore their production at a cost price compatible with their massive use. This process specifically consists in injecting a carbon source at a relatively high temperature over a catalyst which may itself consist of a metal such as iron, cobalt, nickel or molybdenum, supported on an inorganic solid such as alumina, silica or magnesia. The carbon sources may comprise methane, ethane, ethylene, acetylene, ethanol, methanol or even a mixture of carbon monoxide and hydrogen (HIPCO process).

Thus, application WO 86/03455A1 by Hyperion Catalysis International Inc. describes in particular the synthesis of CNTs. More particularly, the process comprises bringing a particle based on a metal, such as in particular iron, cobalt or nickel, into contact with a gaseous compound based on carbon, at a temperature between about 850° C. and 1200° C., the ratio by dry weight of the carbon-based compound to the metal-based particle being at least about 100:1.

From a mechanical point of view, CNTs exhibit excellent rigidity (measured by Young's modulus), comparable to steel, while being extremely light. In addition, they exhibit excellent electrical and thermal conductivity properties which make it possible to envisage using them as additives to confer these properties on various, particularly macromolecular, materials such as polyamides, polycarbonate, polyesters, polystyrene, polyethylether ketones and polyethyleneimine, as well as other thermoplastic and thermoset polymers.

However, CNTs are found to be difficult to handle and to disperse because of their small size and their pulverulence, and potentially, when they are obtained by the CVD technique, their entangled structure, all the more important when it is sought to increase their mass productivity for the purpose of improving production and reducing the amount of residual ash. The existence of strong Van der Waals interactions between the nanotubes also hinders their dispersibility and the stability of the suspensions obtained.

The poor dispersibility of CNTs greatly affects the characteristics of the composites which they form with the polymer matrices into which they are introduced. There is observed in particular the appearance of nanocracks, formed in aggregates of nanotubes, which lead to the composite becoming fragile. Moreover, since CNTs are poorly dispersed, it is necessary to increase their amount in order to reach a given electrical and/or thermal conductivity, which has the effect of increasing the viscosity of the mixture in the die for manufacturing the composite, leading to self-heating of this mixture which may result in degradation of the polymer and a reduction in productivity (decrease in the line speeds in order to limit the pressure generated by the viscosity of the product).

In order to overcome these disadvantages, various solutions have already been proposed in the state of the art. Among these, there may be mentioned sonication, which nevertheless has only a temporary effect, or ultrasonication which has the effect of partially cutting the nanotubes and creating oxygenated functional groups which may affect some of their properties.

It has also been suggested to prepare mixtures in a CNT solvent with dispersing agents such as surfactants including sodium dodecyl sulfate (EP-1 495 171; VIGOLO B. et al, *Science*, 290 (2000), 1331; WANG J. et al, *J. of Chem. Society*, 125, (2003), 2408; MOORE, V. C. et al, *Nanoletters*, 3, (2003), 2408) or polyethoxylated surfactants (JP2005-154630). The latter do not however make it possible to disperse large quantities of CNT, it being possible to obtain satisfactory dispersions only for CNT concentrations of less than 2 or 3 g/l. In addition, the surfactants are capable of desorbing totally from the surface of the CNTs during the dialysis step generally carried out in order to remove the excess surfactant in the solution, which has the effect of destabilizing the suspension obtained.

In the same line of thought, application JP2007-077370 discloses a dispersant for carbon nanotubes in a thermoplastic resin, consisting of an ester of lauric, trimellitic, myristic or stearic acid.

Another solution, proposed in particular in applications EP-1 359 121 and EP-1 359 169, has consisted in preparing a CNT dispersion in a solvent and a monomer and carrying out an in situ polymerization leading to the production of functionalized CNTs. This solution is however complex and may prove expensive depending on the products used. Moreover, the grafting operations risk damaging the structure of the nanotubes and, consequently, their electrical and/or mechanical properties (GARG A. et al, *Chem. Phys. Lett.* 295, (1998), 273).

Examples of such grafting processes have in particular been described by HADDON et al. in *Science*, (1998), 282, p. 95-98 and *J. Phys. Chem., B*2001, 105, p. 2525-2528; SUN et al in *Chem. Mater.*, 2001, 13, p. 2864-2869; CHEN et al. in *Carbon*, (2005), 43, 1778-1814; QUIN et al. in Macromolecules, 2004, 37, p. 752-757; ZHANG et al. in *Chem. Mater.*, 16(11) (2004), 2055-2061.

There is therefore still a need to provide a simple and inexpensive process which makes it possible to prepare homogeneous dispersions of nanotubes, particularly of carbon, optionally at high concentration, in polymer materials, without substantially affecting the mechanical and electrical properties of the nanotubes.

The Applicant has discovered that this need could be satisfied by carrying out a process comprising bringing nanotubes into contact with a given plasticizing agent in order to form a precomposite which may then be introduced into a polymer matrix.

The subject of the present invention is thus a process for preparing a precomposite based on nanotubes, comprising bringing said nanotubes into contact with at least one plasticizing agent chosen from:

alkyl esters of phosphates, of hydroxybenzoic acid (in which the preferably linear alkyl group contains from 1 to 20 carbon atoms), of azelaic acid and of pelargonic acid, phthalates, particularly of dialkyl or of alkylaryl, in particular of alkylbenzyl, the linear or branched alkyl groups independently containing from 1 to 12 carbon atoms, adipates, particularly of dialkyls, sebacates, particularly of dialkyls and in particular of dioctyl, benzoates of glycols or of glycerol, dibenzyl ethers, chloroparaffins, propylene carbonate, sulfonamides, in particular acylsulfonamides in which the aryl group is optionally substituted with at least one alkyl group containing from 1 to 6 carbon atoms, such as benzenesulfonamides and toluenesulfonamides, which may be N-substituted or N,N-disubstituted with at least one, preferably linear, alkyl group containing from 1 to 20 carbon atoms, and mixtures thereof.

The nanotubes which can be used according to the invention may be carbon nanotubes (hereinafter CNTs) or nanotubes based on boron, phosphorus or nitrogen, or alternatively nanotubes containing several of these elements or at least one of these elements in combination with carbon. They are advantageously carbon nanotubes. They may be of the single-wall, double-wall or multi-wall type. The double-wall nanotubes may be prepared in particular as described by FLAHAUT et al. in Chem. Com. (2003), 1442. The multi-wall nanotubes may, for their part, be prepared as described in the document WO 03/02456.

The nanotubes used according to the invention usually have a mean diameter ranging from 0.1 to 200 nm, preferably from 0.1 to 100 nm, more preferably from 0.4 to 50 nm and, even better, from 1 to 30 nm and advantageously a length of more than 0.1 µm and advantageously from 0.1 to 20 µm, for example of about 6 µm. Their length/diameter ratio is advantageously greater than 10 and most often greater than 100. These nanotubes therefore comprise the so-called "VGCF" (Vapor Grown Carbon Fibers). Their specific surface area is for example between 100 and 300 m$^2$/g and their apparent density may be in particular between 0.05 and 0.5 g/cm$^3$ and more preferably between 0.1 and 0.2 g/cm$^3$. The multi-wall carbon nanotubes may for example comprise from 5 to 15 sheets and more preferably from 7 to 10 sheets.

An example of crude carbon nanotubes is commercially available in particular from the company ARKEMA under the trade name Graphistrength® C100.

The nanotubes may be purified and/or treated (in particular oxidized) and/or ground, before being used in the process according to the invention. They may also be functionalized by solution chemistry methods such as amination or reaction with coupling agents.

The grinding of the nanotubes may in particular be carried out in the cold state or in the hot state and may be performed according to known techniques carried out in apparatus such as ball, hammer, roll, blade and gas jet mills or any other grinding system capable of reducing the size of the entangled network of nanotubes. It is preferable that this grinding step is performed according to a gas jet grinding technique and in particular in an air jet mill.

The purification of the nanotubes may be carried out by washing with a solution of sulfuric acid, or of another acid, so as to free them of potential residual inorganic and metal impurities resulting from their process of preparation. The weight ratio of the nanotubes to the sulfuric acid may in particular be between 1:2 and 1:3. The purification operation may moreover be performed at a temperature ranging from 90 to 120° C., for example for a period of 5 to 10 hours. This operation may be advantageously followed by steps of rinsing with water and drying of the purified nanotubes.

The oxidation of the nanotubes is advantageously carried out by bringing them into contact with a sodium hypochlorite solution containing from 0.5 to 15% by weight of NaOCl and preferably from 1 to 10% by weight of NaOCl, for example in a weight ratio of nanotubes to sodium hypochlorite ranging from 1:0.1 to 1:1. The oxidation is advantageously performed at a temperature of less than 60° C. and preferably at room temperature for a period ranging from a few minutes to 24 hours. This oxidation operation may be advantageously followed by steps of filtration and/or centrifugation, washing and drying of the oxidized nanotubes.

In the process according to the invention, the nanotubes (crude or ground and/or purified and/or oxidized and/or functionalized with a nonplasticizing molecule) are brought into contact with a plasticizing agent.

The expression "plasticizing agent" is understood to mean, for the purposes of the present invention, a compound which, introduced into a polymer, increases its flexibility, decreases its glass transition temperature (Tg), increases its malleability and/or its extensibility.

Among the plasticizers cited above, those preferred for use in the present invention comprise sulfonamides, in particular N-butylbenzenesulfonamide (BBSA), N-ethyl-benzene-sulfonamide (EBSA), N-propylbenzenesulfonamide (PBSA), N-butyl-N-dodecylbenzenesulfonamide (BDBSA), N,N-dimethylbenzenesulfonamide (DMBSA), para-methyl-benzene-sulfonamide, ortho-toluenesulfonamide, para-toluene-sulfonamide; phthalates such as di(2-ethylhexyl), diisodecyl, dimethyl, dibutyl and dioctyl phthalates; dialkyl sebacates; dialkyl adipates; and alkyl hydroxybenzoates such as ethyl, butyl or hexadecyl hydroxybenzoates; and mixtures thereof.

The plasticizers may be used in an amount of 1 to 1000% by weight, and preferably from 20 to 200% by weight, relative to the weight of the nanotubes used.

The plasticizer is generally in liquid form, optionally in the molten state or in solution in a solvent. It may thus be brought into contact with the powdered nanotubes for example by direct dispersion or introduction by pouring the plasticizer into the nanotube powder (or conversely), by introducing the plasticizer dropwise into the powder or by nebulization of the plasticizer with the aid of a pulverizer over the nanotube powder. This step may be carried out in traditional synthesis reactors, blade mixers, fluidized bed reactors or in mixing apparatus of the Brabender, Z-arm mixer or extruder type. It is preferable according to the invention to use a conical mixer, for example of the HOSOKAWA Vrieco-Nauta type, comprising a rotary screw rotating along the wall of a conical tank. The dispersion of the nanotubes may optionally be further improved by passing through a ball or bead mill.

At the end of this process, and optionally after removing the solvent (typically by evaporation), a precomposite based on nanotubes and a plasticizer is obtained.

The subject of the invention is also the precomposite which may be obtained according to the above process.

This precomposite is intended to be introduced into a polymer composition in order to form a composite material. In particular, the subject of the invention is also the use of this precomposite for conferring at least one electrical, mechanical and/or thermal property on a polymer material.

The subject of the invention is therefore also a process for the manufacture of a composite material comprising the introduction of the precomposite as defined above into a polymer composition. The latter generally contains at least one polymer chosen from thermoplastic, heat-curable, rigid or elastomeric, crystalline, amorphous or semicrystalline, gradient, block or random homo- or copolymers. At least one thermoplastic polymer and/or elastomer is preferably used according to the invention.

Examples of polymers which can be used may be chosen from: homo- and copolymers of olefins such as acrylonitrile-butadiene-styrene copolymers, ethylene-propylene-diene copolymers and polyolefins such as polyethylene, polypropylene, polybutadiene and polybutylene; acrylic homo- and copolymers and alkyl poly(meth)acrylates such as poly(m-ethyl methacrylate); chlorosulfonated polyethylene; polyacrylonitrile; polyamides; polyimides; polycarbonates; polyesters including ethylene polyterephthalates; polyethers such as polyphenylene ether; polystyrene; poly(vinyl chloride); fluorinated polymers; natural or synthetic rubbers; polyurethanes; and mixtures thereof, without this list being limiting. Thermoset polymers may be used as a variant.

According to one particularly preferred embodiment of the invention, the polymer is chosen from polyamides (PA), among which there may be mentioned in particular PA-6, PA-11 and PA-12, obtained by polymerization of an amino acid and a lactam, PA-6.6, PA-4.6, PA-6.10 and PA-6.12, obtained by polycondensation of a diacid and a diamine, as well as aromatic polyamides such as polyarylamides and polyphthalamides. Some of the abovementioned polymers (PA-11, PA-12, aromatic PAs) are in particular available from the company ARKEMA under the trade name RILSAN®.

It is clearly understood that the choice of the plasticizer used according to the present invention to improve the dispersion of the nanotubes in a polymer matrix will depend on the chemical nature of the matrix to be strengthened by the nanotubes. Table 1 below gives, as a guide, a few examples of particularly appropriate plastizer/polymer matrix combinations.

TABLE 1

Examples of polymer/plasticizer combinations

| Type of polymer to be strengthened | Example of plasticizer that can be used |
|---|---|
| Acrylonitrile-butadiene-styrene (ABS) copolymer | Alkyl esters of phosphates, aryl sulfonamides |
| Acrylic for adhesives and coatings | Phthalates (in particular of alkylbenzyl or of dioctyl); dialkyl adipates; alkyl esters of phosphates |
| Acrylic for other applications | Dialkyl phthalates; dialkyl adipates; azelates; sebacates |
| Polymethylmethacrylate (PMMA) | Phthalates, in particular of di(2-ethylhexyl) |
| Chlorosulfonated polyethylene | Adipates, particularly of dioctyl; sebacates, particularly of dioctyl |
| Styrene-ethylene-butadiene-styrene (SEBS) copolymer | Phthalates, particularly of dioctyl |
| Ethylene-propylene-diene (EPDM) copolymer | Phthalates, particularly of dibutyl or of dioctyl |
| Natural rubber (SBR) | Sebacates, particularly of dioctyl; phthalates, particularly of dibutyl or of dioctyl |
| Polybutylene | Adipates, phthalates, pelargonates |
| Nitrile rubber | Dibenzyl ethers, phthalates, chloroparaffins, alkyl phosphates |
| Polyacrylonitrile | Phthalates, particularly of dibutyl; propylene carbonate |
| Polyamides | Sulfonamides, particularly BBSA, EBSA, PBSA, BDBSA, DMBSA; hydroxybenzoates; phthalates, particularly of dioctyl or of diisodecyl; adipates, particularly of di(2-ethylhexyl); phosphates, particularly of tri(2-ethylhexyl) |

TABLE 1-continued

Examples of polymer/plasticizer combinations

| Type of polymer to be strengthened | Example of plasticizer that can be used |
|---|---|
| Polyimides | Glycol benzoates, particularly diethylene glycol dibenzoate; phthalates, particularly of dimethyl; alkyl esters of phosphates |
| Polycarbonates | Alkyl esters of phosphates, phthalates |
| Polyesters (including PET) | Phthalates |
| Polyphenylene ether | Phthalates |
| Polystyrene | Phthalates, phosphates, sebacates, adipates, azelates |
| Polyethylene | Phthalates, in particular of dioctyl; glycerol benzoates, particularly glyceryl tribenzoate |
| Polypropylene | Sebacates, particularly of dioctyl |
| Poly (vinyl chloride) (PVC) | Dialkyl phthalates, dialkyl adipates, azelates, sebacates |
| Fluorinated polymer | Phthalates, adipates, azelates, sebacates |
| Polyurethanes | Alkyl esters of phosphates, phthalates |

The polymer composition may additionally contain various adjuvants and additives such as lubricants, pigments, stabilizers, fillers or reinforcing agents, antistatic agents, fungicides, flame retardants and solvents.

The composites obtained may be used for the manufacture of casings for electronic circuits, in pipes or reservoirs for petroleum products or fuel oils, for the manufacture of measurement probes, for the manufacture of mechanical parts for the automobile, aeronautics or nautical industries, or alternatively for the manufacture of sports items.

The subject of the present invention is also the use of a plasticizer as defined above for improving the dispersion and/or mechanical properties (in particular tensile and/or impact strength) and/or the electrical conductivity and/or the thermal conductivity of nanotubes in a polymer matrix.

It is thus possible to confer on said composites containing less than 1.5% by weight of carbon nanotubes an electrical conductivity less than $10^6$ ohms.

The invention will now be illustrated by the following nonlimiting examples.

BRIEF DESCRIPTION OF THE DRAWINGS

FIG. 1 is a graph illustrating surface resistivity vs CNT level.

EXAMPLES

Example 1

Preparation and Properties of a CNT/Plasticizer Precomposite

A CNT sample is prepared by chemical vapor deposition (CVD) from ethylene at 650° C., which is caused to pass over a catalyst consisting of iron supported on alumina. The product resulting from the reaction contains an ash content, measured by loss on ignition at 650° C. under air, of 7%. This sample, which will be designated in what follows by CNT1, contains 3% of $Fe_2O_3$ and 4% of $Al_2O_3$, determined by chemical analysis.

The precomposite may then be obtained in the following manner:
- introduction of 1500 g of various batches for the manufacture of the CNT1 powder into a HOSOKAWA Nauta Minimix 020-FFC-50 type mixer via the cap,
- initiation of the stirring at maximum speed (arm speed=10 revolutions/min, screw speed=300 revolutions/min), mixing for 5 minutes,
- injection of 1500 g of BBSA, via two peristaltic pumps, the introduction being made by two branch pipes at the top of the mixer, the pumps being set for an introduction period of about 30 nm,
- continuation of the mixing for 5 min after the injection, and emptying through the bottom valve, with stirring, into polyethylene drums.

Example 2

Preparation of a CNT/Polyamide Composite

Using a BUSS co-mixer, 10% of the precomposite of Example 1 were dispersed in the ARKEMA polyamide-12 Rilsan® AMNO TLD (fluid polyamide grade) at a flow rate of 10 kg/h with a temperature profile of 210/250/250/250/240° C., in order to obtain a composite material containing 5% by weight of CNT and 5% by weight of plasticizer (BBSA).

Example 3

Mechanical Properties

The composite of Example 2 was extruded in a microDSM-type twin-screw extruder (rectangular flat die of 20×0.2 mm$^2$), used under the following conditions:
reference temperature: 300° C.
temperature of the molten mixture: 285° C.
screw rotation speed: 100 revolutions/min
mixing time: 30 sec
die: flat.

IFC test pieces were then cut out with the aid of a hollow punch in the extruded film. These test pieces were subjected to tensile tests, performed on an MTS dynamometer at a speed of 50 mm/min, in order to compare the mechanical properties of the composite to those of composites manufactured under the same conditions from carbon nanotubes (5% by weight) and from the same polyamide resin but containing no plasticizer. The results of these tests are assembled in Table 2 below.

TABLE 2

Mechanical properties of the CNT/(plasticizer/)polyamide composites

| Ex. | Composite | Breaking strain (MPa) | Break elongation (%) | Yield stress (MPa) | Yield elongation (%) |
|---|---|---|---|---|---|
| 3A | AMNO ® LTD/Graphistrength ® C100 Batch 1 | 32 ± 5 | 52 ± 20 | 34 ± 7 | 8 ± 3 |
| 3C | Composite according to the invention | 35 ± 6 | 65 ± 31 | 29 ± 4 | 12 ± 2 |

It is therefore observed that the presence of a plasticizer does not substantially modify the mechanical properties of the composites.

Example 4

Measurement of the Resistivity of the Composites Obtained According to the Invention The composite obtained in Example 2 was diluted in the dry state in the same polyamide as that used for its manufacture, so as to obtain four composites containing from 0.5 to 3% by weight of CNT.

These composites were then extruded at 285° C. in a microDSM-type twin-screw extruder (100 revolutions/min, circular die termed rod), and then the resistance of the rods obtained was measured with the aid of a Sefelec M1500P megohmmeter and corrected, by calculation, for the surface resistivity.

A comparative test was performed between this composite ("CNT/BBSA") and:
- a composite A free of plasticizer and obtained as described above, but from CNTs produced according to application WO 86/03455 ("Reference CNT-Hyperion Catalysis") and
- a composite B free of plasticizer and obtained as described above ("CNT").

The resulting percolation curves are illustrated in the accompanying FIGURE.

Results:

As illustrated in this FIGURE, the resistivity of the composites decreases when the amount of CNT which they contain increases. In addition, that of the composites obtained according to the invention always remains well below that of the composites containing no plasticizer, which indicates their better electrical conductivity and the better dispersion of the CNTs in these composites according to the invention. The percolation threshold of the composites obtained according to the invention is also lower.

Example 5

Evaluation of the Dispersion of the CNTs in the Composites Obtained According to the Invention Rods of composite materials containing 5% of CNT in the polyamide, obtained according to the invention and corresponding to Composite B in Example 4, were extruded. Photographs were then taken under an optical microscope in transmitted light from 2 μm thick sections prepared in parallel with the direction of extrusion, at the rate of 6 photographs per section, at the nominal 200× magnification. The percentage of the surface of these composite materials occupied by the CNT aggregates was then evaluated. The mean of the values obtained for each of the 6 photographs was calculated.

The results obtained are assembled in Table 3 below.

TABLE 3

|  | Composite B | Composite obtained according to the invention |
|---|---|---|
| Mean % of surface occupied by the CNT agglomerates | 1.69% | 0.50% |

It is therefore observed that the composites obtained according to the invention exhibit a better dispersion of the CNTs in the polyamide matrix, which should result in better mechanical properties such as their impact or crack strength in particular.

The invention claimed is:

1. A process for preparing a precomposite consisting of nanotubes and one or more plasticizing agents, comprising bringing said nanotubes into contact with said one or more plasticizing agents, wherein the one or more plasticizing agents are selected from the group consisting of:
   alkyl esters of hydroxybenzoic acid,
   alkyl esters of pelargonic acid,
   benzoates of glycols and of glycerol,
   dibenzyl ethers, and
   sulfonamides.

2. The process of claim 1, wherein the nanotubes are carbon nanotubes.

3. The process of claim 2, wherein the carbon nanotubes are obtained by a chemical vapor deposition process.

4. The process of claim 1, wherein the nanotubes have a diameter ranging from 0.1 to 100 nm.

5. The process of claim 1, wherein the nanotubes have a length of 0.1 to 20 μm.

6. The process of claim 1, wherein the nanotubes are crude nanotubes having one or more of the following treatments: purified with the aid of a sulfuric acid solution, oxidized with the aid of a sodium hypochlorite solution, ground with the aid of an air jet mill or functionalized with the aid of a nonplasticizing molecule.

7. The process of claim 1, wherein the one or more plasticizing agents are selected from the group consisting of: sulfonamides; and alkyl hydroxybenzoates.

8. The process of claim 7, wherein the one or more plasticizing agents are selected from the group consisting of: N-butylbenzenesulfonamide (BBSA), N-ethylbenzenesulfonamide (EBSA), N-propylbenzenesulfonamide (PBSA), N-butyl-N-dodecylbenzene sulfonamide (BDBSA), N,N-dimethylbenzenesulfonamide (DMBSA), para-methylbenzenesulfonamide, ortho-toluenesulfonamide, para-toluenesulfonamide, ethyl hydroxybenzoate, butyl hydroxybenzoate, and hexadecyl hydroxybenzoate.

9. The process of claim 1, wherein the plasticizer is used in an amount of 1 to 1000% by weight relative to the weight of nanotubes used.

10. A precomposite obtained according to the process according to claim 1.

11. A process for the manufacture of a composite material consisting of nanotubes, one or more plasticizing agents according to claim 1 and a polymer composition comprising preparing a precomposite according to the process of claim 1 and, after such preparing, adding the precomposite into a polymer composition.

12. The process of claim 11, wherein the polymer composition contains a polymer selected from the group consisting of: homo- and copolymers of olefins; acrylic homo- and copolymers and alkyl poly(meth)acrylates; chlorosulfonated polyethylene; polyacrylonitrile; polyamides; polyimides; polycarbonates; polyesters; polyethers; polystyrene; poly(vinyl chloride); fluorinated polymers; and polyurethanes.

13. The process according to claim 12, wherein the polymer is a polyamide.

14. The process of claim 1, wherein the one or more plasticizing agents are selected from the group consisting of:
   alkyl esters of hydroxybenzoic acid in which the alkyl group is linear and contains from 1 to 20 carbon atoms,
   alkyl esters of pelargonic acid,
   benzoates of glycols and of glycerol,
   dibenzyl ethers, and
   arylsulfonamides in which the aryl group is optionally substituted with at least one alkyl group containing from 1 to 6 carbon atoms and which may be N-substituted or N,N-disubstituted with at least one linear alkyl group containing from 1 to 20 carbon atoms.

15. The process of claim 1, wherein the one or more plasticizing agents are selected from the group consisting of:
   alkyl esters of hydroxybenzoic acid in which the alkyl group is linear and contains from 1 to 20 carbon atoms,
   alkyl esters of pelargonic acid,
   benzoates of glycols and of glycerol,
   dibenzyl ethers,
   toluenesulfonamides and benzenesulfonamides which may be N-substituted or N,N-disubstituted with at least one linear, alkyl group containing from 1 to 20 carbon atoms.

16. The process of claim 1, wherein the nanotubes have a diameter ranging from 0.4 to 50 nm.

17. The process of claim 1, wherein the nanotubes have a diameter ranging from 1 to 30 nm.

18. The process of claim 1, wherein the plasticizer is used in an amount of 20 to 200% by weight relative to the weight of nanotubes used.

19. The process of claim 11, wherein the polymer is selected from the group consisting of: acrylonitrile-butadiene- styrene copolymers; ethylene-propylene-diene copolymers; poly(methyl methacrylate); chlorosulfonated polyethylene; polyacrylonitrile; polyamides; polyimides; polycarbonates; ethylene polyterephthalate; polyphenylene ether; polystyrene; poly(vinyl chloride); fluorinated polymers; and polyurethanes.

* * * * *